Jan. 6, 1959 F. C. BAYER 2,867,269
FUEL FLOW AND CONTROL SYSTEM
Filed Oct. 29, 1953 2 Sheets-Sheet 2

Inventor
FRANK C. BAYER

United States Patent Office 2,867,269
Patented Jan. 6, 1959

2,867,269

FUEL FLOW AND CONTROL SYSTEM

Frank C. Bayer, Euclid, Ohio, assignor to Thompson Products, Inc., Cleveland, Ohio, a corporation of Ohio Application October 29, 1953, Serial No. 388,983

6 Claims. (Cl. 158—36.4)

The present invention relates to a fuel flow and control system. More particularly, the present invention relates to a fuel flow and control system of general utility but particularly advantageously employable for controlling fuel flow to a gas turbine or the like operable with a fuel having contaminants therein.

In general, heretofore known types of fuel control systems for gas turbines and combustion engines and the like have had short lives or been completely inoperative when utilized with low grade fuels having a substantial proportion of foreign matter and contaminants therein such as grit and dirt and varnishes and the like. These systems have had such short lives and general inoperability because the control elements of the system became jammed or clogged or otherwise inaccurate or inoperable by the foreign matter and contaminants.

By the present invention, however, these problems and difficulties have been obviated and there is provided a fuel flow and control system readily operable to accurately control the flow of low grade fuels, even fuels having very high percentages of contaminants and other foreign matter therein. The system of the present invention obviates the aforementioned difficulties and problems by providing two interconnected yet flow-isolated flow systems one of which carries the fuel and the other of which carries a control medium such as substantially clean oil or the like. These two systems are so flow-isolated that the fuel flow is isolated from the control medium flow and yet are so interconnected that variable control of the control medium, such as clean oil or the like, operates to control fuel flow.

Due to the nature, character and quantity of the contaminants often present in many low grade fuels, and particularly in such low grade fuels as Bunker-C fuel, even filtering processes and the like have been ineffective to permit the utilization of most heretofore known types of fuel control mechanisms. When their utilization was attempted however, it has been found that the clogging etc. which ultimately resulted was so serious that ordinary flushing and purging procedures did not cleanse the system sufficiently well to permit renewed operation thereof.

By the system of the present invention, however, these difficulties are also obviated and there is provided a fuel flow and control system which may be readily flushed and purged of the numerous contaminants etc. appearing in quantity in low grade fuels.

An important feature of the dual flow control system of the present invention is that it is particularly advantageously employable with a gas turbine or the like operative with very low grade, contaminated fuels. One preferred manner of operating a gas turbine is to start the same on diesel oil with auxiliary starting equipment. The fuel control system of the present invention then has diesel oil fed through the fuel flow portion of the system and controls the diesel oil flow during the starting operation until the main fuel is heated to its proper operating temperature, which in the case of Bunker-C fuel is approximately 240° F. Thereafter the contaminated fuel is gradually supplied to the main fuel pump and the diesel oil supply is simultaneously shut off. Operation of the gas turbine is then continued on the low grade fuel. Due to the flow isolation between the control medium portion and the fuel portion of the system of the instant invention, contaminants and the like do not affect the control system. Since the system embodying the principles of the present invention is readily adapted to be flushed and purged of contaminants, prior to shutting down, a similar transition from low grade fuel to diesel oil is made and all fuel system components are thereby purged of contaminants. The system is thus clean upon shutting down of the combustion device for which it controls fuel flow. Gas turbines have been mentioned here as a principal example of the combustion device, it being understood, of course, that the system of the present invention is a system of general utility and that gas turbines and the like form preferred examples of efficient combinations with the fuel flow system of the present invention.

Thus, it is an important feature of the present invention to provide a dual fuel flow and control system wherein a fuel flow system and a control medium flow system are isolated for independent flow and interconnected for fuel flow control by control of the control medium flow.

Another important feature of the present invention is to provide a fuel flow and control system wherein fuel flow is controlled by controlling pre-selected parameters of a flowing control medium.

Still another important feature of the present invention is to provide a dual fuel flow and control system, as described, wherein fuel flow is controlled linearly with respect to the speed of the device to which the fuel is supplied and linearly with respect to variable medium pressure from a fuel regulator or the like.

Yet another object of the present invention is to provide a control system operable on clean control medium such as lubricating oil at all times and a main fuel system operable on any desired type of fuel and quality of fuel such as either diesel oil or Bunker-C, the systems being so interrelated that variable control of the control system operates to correspondingly vary the control of the fuel system.

Yet another object of the present invention is to provide a readily contaminant-purgible fuel system having a fuel pump, a fuel pressure regulator valve, and a flow distributor serially connected to supply fuel to a plurality of fuel nozzles and fuel nozzle valves, and a control medium system including a positive fixed displacement fuel medium pump, a speed sensing valve, a throttle valve, a pilot valve, and a fuel nozzle simulating member serially connected, means controlling the throttle valve displacement in accordance with the speed of the combustion device to which fuel is supplied by the fuel system, and in accordance with variable control medium pressure from a fuel regulator or the like, and means interconnecting the fuel system and the control medium system to maintain certain pre-selected parameters of fuel flow and control medium flow substantially equal and certain other pre-selected parameters of fuel flow and control medium flow at a substantially constant ratio.

Yet another object of the present invention is to provide an interconnected fuel system and control medium system, having flow isolation therebetween, with a speed sensing valve in the control medium system responsive to variations in the speed of the combustion device to which fuel is supplied by the fuel flow system.

Yet another object of the present invention is to provide a control system, as described, with a relief valve so interconnecting the throttle valve, the speed sensing valve and the positive displacement pump as to maintain substantially constant pressure drop across the throttle valve as control medium is supplied thereto from the positive displacement pump by the speed sensing valve.

Yet another object of the present invention is to provide a relief valve structure differentially controllable for control medium referenced relief and relief flow control of the control medium flow between one of the reference ports and an additional port.

Yet another object of the present invention is to provide a speed sensing valve structure having a valve piston therein operable to be self-referenced from reference passages in the valve body and operable for linear displacement in accordance with control medium flow and the speed of operation of a combustion device to which fuel is supplied by a system controlled by the valve structure.

Yet other objects, features and advantages of the present invention will become readily apparent from the following detailed description of the principles of the present invention, and a preferred embodiment thereof, from the claims, and from the accompanying drawings illustrating a preferred embodiment of the present invention and disclosing fully and completely each and every detail shown thereon, in which like reference numerals refer to like parts, and in which:

Figure 1:
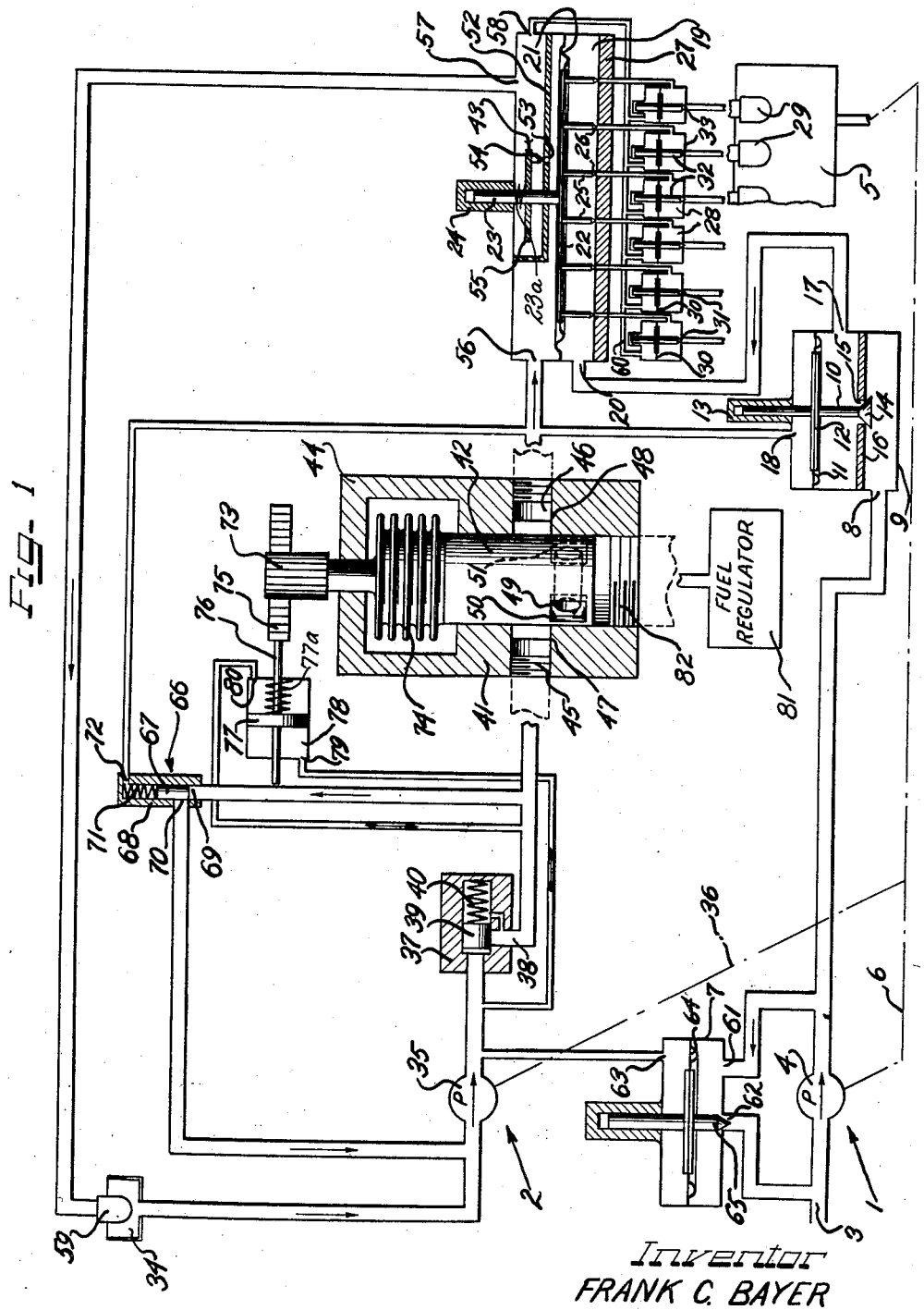
Figure 1 is a diagrammatic illustration of a preferred embodiment of the dual fuel flow and control system of the present invention and the components thereof.

The fuel flow and control system schematically and diagrammatically illustrated in Figure 1 is a dual system including a fuel flow system 1 and a control medium flow system 2 for isolated flow of the two fluids, fuel such as Bunker-C and control medium such as clean lubricating oil, as preferred examples, respectively. The terms control medium, control oil, or oil, are used interchangeably herein to indicate the use of a control medium. The liquid fuel may also be such a fuel as diesel oil interchangeably connectable for supply to the fuel flow system 1, as described, or any other desired type of preferably liquid fuel. The fuel is fed into the flow system 1 through an inlet port 3 from any fuel supply source and thereafter to a fuel pump 4 preferably having high volumetric and high pressure characteristics, and which may be a gear pump or a screw pump or a plunger or piston pump or a centrifugal pump or the like.

In this preferred embodiment of the present invention the fuel pump 4 is preferably driven by the combustion device such as a gas turbine or the like 5 through any desired convenient mechanical coupling indicated generally by the broken dot-dashed line 6.

Although the main fuel pump 4 is by-passed by a fuel pump relief valve 7 which is referenced to the control system 2 in a manner hereinafter described in detail, the fuel pump 4 delivers fuel directly to the inlet 8 of a fuel pressure regulator valve 9. The fuel pressure regulator valve 9, which is also referenced against the control system 2, is a diaphragm differential pressure actuated valve wherein a valve stem 10, carried by a fluid isolation axially distortable diaphragm 11 having anti-tilt distortion plates 12 secured thereto, is reciprocably slidable in the region of one end thereof in a valve stem bearing 13 and at the other end thereof carries a valve head or valve cone 14 arranged to open and close a port 15 in a valve plate 16 within the valve 9. The fuel pressure regulator valve outlet port 17 lies on the opposite side of the valve plate 16 from the inlet port 8, and is positioned between the isolation diaphragm 11 and valve plate 16. As is the case with the fuel pump relief valve 7 and the regulator valve 9, control of many of the valves is obtained hydraulically. Thus, as is common to this type of valve, the valves have ports which act as intake and discharge for the fluid being conducted and they also have one or more ports to connect to lines containing the particular control fluid. These valves are then in communication with and whole or partly controlled by this control fluid. When this condition exists these valves will be herein referred to as being referenced to the control fluid or to the source of control fluid indicating that they are connected by conduits or lines to the fluid and are controlled thereby.

A control medium inlet 18 is provided in the fuel pressure regulator valve 9 on the opposite side of the isolation diaphragm 11 from the fuel inlet and outlet and valve members for reference control of the valve 9 to the control medium system 2 as hereinafter described.

Fuel flow through the fuel pressure regulator valve 9 is fed to a flow distributor 19 through an inlet port 20 therein. The flow distributor 19 is also an isolation diaphragm type valve structure having a diaphragm 21 carrying a pair of strengthening or anti-tilt plates 22, on the upper side of which there is mounted a valve stem 23 slidably arranged in a valve stem bearing 24, and on the lower of which anti-tilt plates, there is mounted a plurality of valve pins 25 arranged to open and close an equal plurality of outlet ports or distribution valve ports or needle valve orifices 26 for controllably feeding fuel through a fuel distributor plate 27, individually, to an equal plurality of diaphragm type or differentially actuated fuel nozzle valves or needle valves 28 controllably feeding fuel to the fuel nozzles 29 of the combustion device 5. The fuel nozzles valves 28 are parallelly connected and each includes an isolation diaphragm 30 reinforced by plates or the like and referencing fuel pressure against control oil pressure. The fuel inlet and outlet of each of the fuel nozzle valves 28 are on the same side of the diaphragms 30 respectively. The outlet port 31 of each of these fuel nozzle valves is properly adapted to be opened and closed by valve stems 32 having tapered valve heads 33. The plates 22 and valve stems 25 are urged downwardly by a coil compression spring 23a, which surrounds the valve stem 23 and abuts the valve carrying member 55 and the top of the chamber in which the pilot valve 43 is located.

The flow distributor 19, which is preferably constructed as described in my co-pending application entitled "Combined Metering Valve and Flow Distributor," Serial No. 388,984, and filed on even date herewith, has its fuel inlet port 20 and fuel outlet ports 26 on the same side of the isolation diaphragm 21 for flow isolation referencing against pre-selected parameters of the control medium, such as control medium pressure as controlled by the speed of operation of the gas turbine or the like 5 and a fuel regulator hereinafter further described.

The control medium system 2 is supplied with a control medium such as clean lubricating oil or the like from any convenient source such as a tank 34 and/or from the lubricating system of the gas turbine 5. The control oil is supplied from its source to a control oil pump 35 which should have relatively high pressure and flow capacity, high volumetric efficiency and, further, should be a positive displacement type pump, such as a gear pump, piston pump or the like. The pump 35 is preferably driven by a gas turbine or the like 5 through any convenient mechanical coupling indicated generally by the broken dot-dashed line 36 and is so driven that its volumetric output is proportional to the speed of operation of a gas turbine or the like 5.

The output from the pump 35 is fed directly to a speed sensing valve 37 having an outlet 38 variably opened and closed by a piston or the like 39 which is preferably spring-biased towards closing the inlet by a spring 40 and referenced against outlet pressure by opening the back end of the piston 39 to the outlet port 38. The preferred structure for the speed-sensing valve 37 will be further described in detail hereinbelow in conjunction with the cross-sectional illustration thereof in Figure 3. It will be recognized from the structure of valve 37 that it is responsive to pressure on the inlet side and will increase the flow linearly with pressure increase and may thus be termed a linear flow valve. Because of its overall function in the system and its responsiveness to the speed of the pump 37, it is referred to as a speed responsive valve.

The control liquid from the outlet 38 of the speed-sensing valve 37 is passed to a throttle valve assembly 41 having a piston 42 therein rotatably and reciprocably controlled for controlling the control oil flow therethrough to a pilot valve 43 mounted in cooperating combination with the flow distributor 19. The throttle valve 41 is preferably constructed as described in my co-pending application entitled "Throttle Valve Assembly" Serial No. 388,985, and filed on even date herewith.

Control liquid flow through the throttle valve 41 is effected by means of a rectangular control orifice arrangement. To this end, as schematically depicted in Figure 1, a housing 44 has a cylindrical bore therein for slidably and rotatably guiding the piston 42. An inlet port 45 and an outlet port 46 communicate with the cylinder bore through square orifice recesses 47 and 48, respectively. The recesses 47 and 48 are square, but may be angular, rectangular, or of other desired shape. The piston 42 has a transverse aperture 49 therethrough terminated in similar square orifice recesses 50 and 51 cooperatively related to the housing orifice recesses 47 and 48. These square orifice recesses 50 and 51 may also be of angular, rectangular, or other desired shape, preferably to correspond to the shape of the recesses of the inlet and outlet ports. Thereby, controlled reciprocation of the piston 42 selectively increases and decreases the flow area for the control oil through the piston aperture 49, and controlled rotation or angular displacement of the piston 42 similarly controls available flow area for the control fluid. Thus control of the oil flow through the throttle valve 41 obtains from axial movement of the piston 42 and/or angular displacement of the piston 42. Stated otherwise, increased fuel flow causes the throttle valve 41 to move in an opening direction. The mechanism for obtaining this movement or displacement of the piston will be described later.

By controlling the oil flow through the throttle valve 41, a controlled quantity of oil at controlled pressure is provided to the pilot valve 43 which is preferably formed as an integral part of the structure of the combined metering valve and flow distributor described in detail in my aforementioned co-pending application of the same title. Schematically, however, the pilot valve 43 proportionally controls the control oil flow through the system limiting the flow quantity to a preselected proportion of the volume rate of fuel flow; the proportion preferably being the reciprocal of the number of fuel nozzles or fuel nozzle valves. In the illustration of Figure 1 the pilot valve 43 includes a valve plate 52 which is on the control medium side of the isolation diaphragm 21 and sealingly separates that chamber into two chambers inter-communicated by a valve port or orifice 53 in the plate 52. A valve closure pin or needle 54 is mounted on a carrying member 55 secured for reciprocal motion together with the diaphragm 21 and the fuel flow distributor valves 25 by securing the carrying member 55 to the valve spindle 23 on the outlet side or above the plate 52. Control oil enters the pilot valve through an inlet 56 for pressure engagement against the diaphragm 21 to balance the same against the pressure from the fuel provided against the opposite side thereof through the flow distributor inlet port 20. Under flow conditions control oil flows through the pilot valve inlet port 56, thence through the pilot valve orifice 53 to the outlet ports 57 and 58 leading to the fuel nozzle simulating member 59 for return to the tank or the like 34 and through the outlet port 58 to the reference side of the fuel nozzle diaphragms 30 in parallel connection through a common manifold 60. The purpose of spring 23a is to provide a pressure drop of significant magnitude in order to minimize the effect of slightly imperfect balancing of pressure drop across orifices 53 and 26. Equal flow through each orifice 26 with that through orifice 53 is dependent on equal orifice areas and pressure drop. Without the aforementioned spring, the pressure drop could be indeterminate and very low which would require extremely precise accuracy in balancing the pressure drop. A very slight absolute error in balancing pressure drops at a higher level (as a result of using a spring), thus will not result in a significant unbalancing in flow through orifices 26 and 53. It may thus be seen that if the fluid orifices were fixed in size and small enough to produce a sufficiently high pressure drop to operate the means which senses pressure drop, then under full load or flow conditions the pressure drop would be so high that fuel flowing through the orifices would be overheated, and additionally, a waste of power will occur.

The purpose of the attached valve stems 25 is to provide variable flow control orifices in each branch line equal in area at all times to that of variable orifice 53—54 in the control line. To duplicate the flow in the control line in each branch line requires that the respective flow control orifice areas be equal and the pressure drop across the orifice be equal. Valve 9 simply equalizes the upstream pressure to orifice 25—26 to that of orifice 53—54. Valve 31—32 equalizes the downstream pressure of orifice 24—26 to that of orifice 53—54. Thus with equal upstream pressure, equal downstream pressure, and equal orifice areas, the flow through each branch line is equal to the flow through the control line. Hence, the function of valve 9 and 31—32, although similar, are separate and distinct from each other. The diaphragm 21 serves to isolate the control fluid from the fuel while metering pins 25 and 54 are simultaneously positioned as a result of the pressure drop across orifice 53—54 in opposition to the opposing force of the spring 23a.

To control the fuel feed through the flow distributor 19 to the internal combustion device 5 as function of the speed of operation of the combustion device 5, the fuel flow system 1 and the control medium system 2 are referenced together to maintain the several flow parameters of each system within pre-selected ratios throughout the system. The first step in referencing involves referencing the fuel pressure at reference medium pump 35. This is accomplished through the by-pass valve 7 which is a differential diaphragm type valve having a fuel inlet 61 and a fuel outlet 62 on one side of the diaphragm and an oil inlet 63 on the opposite side of the diaphragm, the diaphragm being identified generally by the numeral 64. The valve further includes an opening and closing valve stem and head means 65 operating to open and close the outlet port 62 in accordance with the differential pressure between the oil pressure and the fuel pressure at the output of the pumps 4 and 35. The inlet 61 is fed from the output of the pump 4 while the by-pass outlet 62 leads to the input side of the pump 4. When the pressure at the output of the pump 4 is excessive with respect to the output pressure of the pump 35 the diaphragm is "raised" and the bypass valve is opened for bypassing fuel circuitously about the pump 4. So too, when the control medium pressure at the output of the pump 35 is excessive with respect to the fuel pressure at the output of the pump 34 the diaphragm is urged to close the outlet port 62 thereby closing the bypass path and permitting outlet pressure from fuel pump 4 to build up. In this manner the output pressures of the pumps 4 and 35 are maintained substantially equal. Pump 4 could be replaced by other pumps having a sufficient displacement, but a positive displacement pump is chosen because of the high-pressure requirements. The valve 7 equalizes the output pressure only of pump 4 to that of pump 35, not the flow. In addition, valve 7 provides the function of a relief valve, which is desirable in a system incorporating a positive displacement pump.

The control medium pressure at the inlet 56 to the flow distributor is referenced against the fuel inlet pressure to the flow distributor at inlet 20, for equal pressures by comparing the same at the fuel regulator pressure valve 9; the points 20 and 17 being connected together and the points 56 and 18 being connected together for that purpose.

Figure 2:
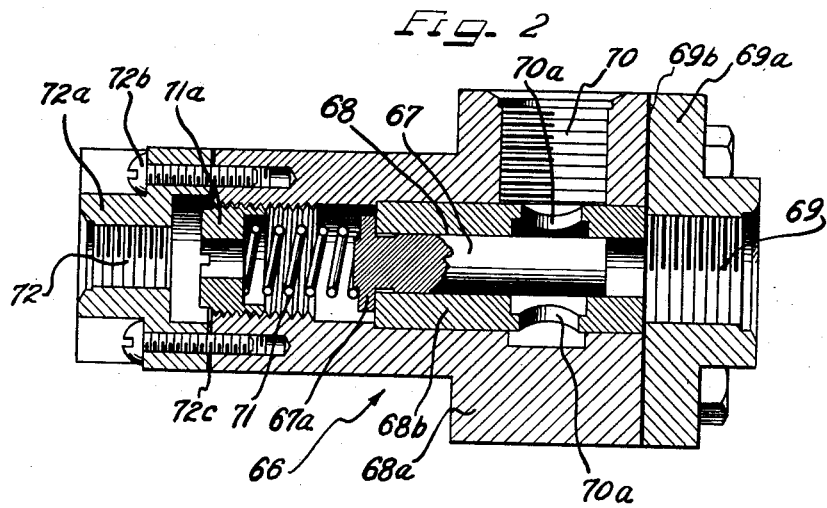
Figure 2 is a cross-sectional view of a control medium referenced relief valve embodying the principles of the present invention.

Between these two reference positions which reference the control oil pump outlet pressure against the fuel pump outlet pressure and the control oil pressure at the inlet to the pilot valve against the fuel pressure at the inlet to the flow distributor respectively, the control oil pressure and flow rate is governed by the speed sensing valve 37 and the throttle valve 41. The speed sensing valve is constructed to control control medium pressure with respect to the speed of operation of the pump 35 as driven linearly by the combustion device 5 while the throttle valve is constructed and governed so that its outlet pressure and the flow rate through the pump operates to control fuel flow linearly with respect to the variable control oil pressure, hereinafter described. To this end, the pressure drop across the throttle valve 41 is maintained substantially constant by referencing a relief valve connected across the pump 35 and speed sensing valve 37 against the outlet pressure from the throttle valve at the outlet 46 thereof. The relief valve, indicated generally at 66 and further described in detail hereinbelow in conjunction with the illustration of Figure 2, is essentially a piston 67, cylinder 68 assembly having a main inlet 69 and a main outlet 70 to be opened and closed selectively by the piston 67 which is normally biased to a closed position with a force corresponding to the desired pressure drop across the throttle valve 41 by a relief valve piston biasing spring or the like 71. The throttle valve outlet pressure 46 is fed to the spring biased end of the piston 67 through a reference pressure inlet port 72 for urging the piston closed with a force corresponding to the sum of the biasing spring 71 and the control medium pressure from the outlet 46 of the throttle valve. The opposite end of the piston 67 is opposed by control oil pressure from the outlet 38 of the speed sensing valve 37 and the inlet pressure to the throttle valve 41 at inlet 45; the pressure at the outlet of the speed sensing valve being the same as the pressure at the inlet pressure to the throttle valve 41.

The outlet 70 from the relief valve 66 is directly connected to the inlet side of the control medium pump 35 and adapted to be variably opened and closed by reciprocating movement of the piston 67 of the relief valve 66. By this means the pressure drop across the throttle valve 41 is maintained substantially constant since an increase in control medium pressure at the outlet of the throttle valve 41 will operate to close the relief valve 66 thereby causing an increased inlet pressure to the throttle valve 41. Similarly, an increased inlet pressure to the throttle valve 41 creating an excessive pressure drop across the throttle valve will cause the relief valve 66 to open and bypass a portion of the control medium back to the inlet of the pump 35 thus decreasing control medium pressure to the inlet to the throttle valve 41.

By maintaining substantially constant pressure drop across the throttle valve 41 control medium flow through the throttle valve may be so controlled as to vary linearly with respect to variable control oil pressure from a fuel regulator at constant speed and linearly with respect to speed at constant variable control oil pressure from a fuel regulator. This control is accomplished through the throttle valve by varying the cross-sectional flow area longitudinally of the valve at the angular orifices 47—50 and 48—51 in response to variable control oil pressure from a fuel regulator, and the cross sectional flow area at these orifices transversely or angularly relative to the valve in response to engine speed.

To vary cross-sectional flow area angularly the throttle valve piston 42 is mounted for angular displacement in proportion to the speed of operation. To this end, the piston 42 is secured to a gear 73 of a gear and rack assembly through a flexible coupling comprising a bellows 74 for rotation or angular displacement therewith. The bellows 74 affords a coupling of high angular distortion resistance and low axial distortion or displacement resistance. Thus rotation of the gear 73 effects rotation of the piston 42 thereby increasing or decreasing the flow areas through the throttle valve 42 by varying the degree of alignment between the rectangular openings 50 and 51 in the valve 42 and the ports 45 and 46 in the bore of the housing 44.

Rotation of the gear 73 is accomplished by meshing the same with a rack 75 which is reciprocally driven by the piston rod 76 connected to the piston 77 of a double acting piston-cylinder assembly, the cylinder 78 of which is differentially connected across the speed sensing valve 37. The inlet 79 at one end of the cylinder 78 is connected for acceptance of control oil pressure from the inlet to the speed sensing valve 37 while the inlet 80 at the opposite end of the cylinder 78 is connected to the outlet of the speed sensing valve 37. A spring 77a biases the piston 77 toward the high pressure end of cylinder 78 and as the pressure differential across piston 77 increases with increasing output of pump 35, the piston 77 will be moved against the spring 77a to move the rack 75.

Since the speed sensing valve 37 has a pressure drop thereacross linearly variable with respect to the speed of operation of the gas turbine 5 or the like and the control medium pump 35, in the manner hereinafter described, the piston 77 is reciprocally displaced as a linear function of the pressure drop across the valve 37 and therefore linearly displaced with respect to the speed of operation of the gas turbine 5.

Since the control medium pump 35 is a fixed displacement pump driven by the gas turbine 5 or the like the flow rate therethrough is a linear function of the speed of the gas turbine 5. This flow from the pump 35 must pass through the speed sensing valve 37 thereby opening and closing the valve 37 linearly with respect to speed. The valve 37 being self-referenced to outlet pressure has a pressure drop thereacross and a displacement which are, therefore, linear functions of the flow rate therethrough. Thus, the pressure drop across the speed sensing valve 37 is a linear function of the speed of operation of the gas turbine or the like 5.

The length of the flow area through the throttle valve is, as stated, a linear function of variable control oil pressure. The variation in length is accomplished by controlled reciprocation of the piston 42 by a fuel regulator indicated generally by the numeral 81. The fuel regulator 81 is a device which delivers variable control oil pressure that actuates the piston 42 of the throttle valve 41 to establish the desired fuel flow rate as determined by the fuel regulator. The fuel regulator supplies the variable control oil pressure in response to various signals such as engine speed, load, throttle position, compressor discharge pressure, turbine inlet temperature, altitude, etc. which the fuel regulator receives. The variable control oil pressure generated by the fuel regulator is piped to the variable control oil pressure inlet port 82 of the throttle valve to act on the end of the piston 42 actuate and control axial movement of the piston 42 and therefore control the control oil flow area at the throttle valve linearly with respect to variable control oil pressure.

This manner of regulating the length or height of the flow area through the throttle valve 41 varies the flow area linearly with respect to variable control oil pressure and linearly with respect to variable speed, while maintaining the fuel system and the control system in flow-isolation. Thus, in the operation of the system of the present invention, by referencing the fuel system against the control medium system i. e., using pressure responsive control valves for the fuel system which are pressure connected to the control system, fuel of any desired character may be accurately controlled both with regard to fuel pressure and fuel flow rate without danger of improper operation of the control elements.

In this system, in operation, fuel is pumped by the pump 4 and control medium is pumped by the pump 35 and the two pumps are referenced for substantially equal flow pressures. Thereafter the control medium flow rate and pressure is controlled as a linear function of the speed of operation and variable control oil pressure and again the fuel system is referenced against the control system for substantially equal pressures. Following this referencing, accomplished at the fuel pressure regulator valve 9 the fuel system is again referenced against the control system at the pilot valve 43 and the flow distributor 19 where the fuel pressure and the control medium pressure are again matched. At this point the pilot valve also meters the control medium flow rate to a proportion of the fuel flow rate equal to the reciprocal of the number of fuel nozzles 29 or the number of fuel nozzle valves 28. This metering is accomplished by preferably constructing the pilot valve orifice 53 and closure control pin 54 substantially identical to the distributor orifice 26 and the valve pins 25 respectively.

At the outlet from the pilot valve control system oil pressure is matched against fuel nozzle valve fuel pressures for individual control operation of the fuel nozzle valves 28. Another outlet from the pilot valve 43 returns the oil to the source 34 through a fuel nozzle simulating member 59 which is so constructed as to have a flow rate therethrough equal to the controlled flow rate for each of the nozzles 29. For this purpose it may be constructed the same as the nozzle but preferably is of more economical construction. Back pressures from the nozzle simulating member 59 return to the fuel nozzle valves 28 maintaining the same in slave relation to the nozzle simulating member 59 i. e. the valves 28 are controlled by the action of the nozzle simulating member 59. In this manner the fuel system is controlled at all points for operating parameters determined by operating parameters of the control system. Further, it will be seen that the flow through the control system is isolated from the flow through the fuel system so that impurities in the fuel will not cause a malfunction of the control elements.

Figure 3:
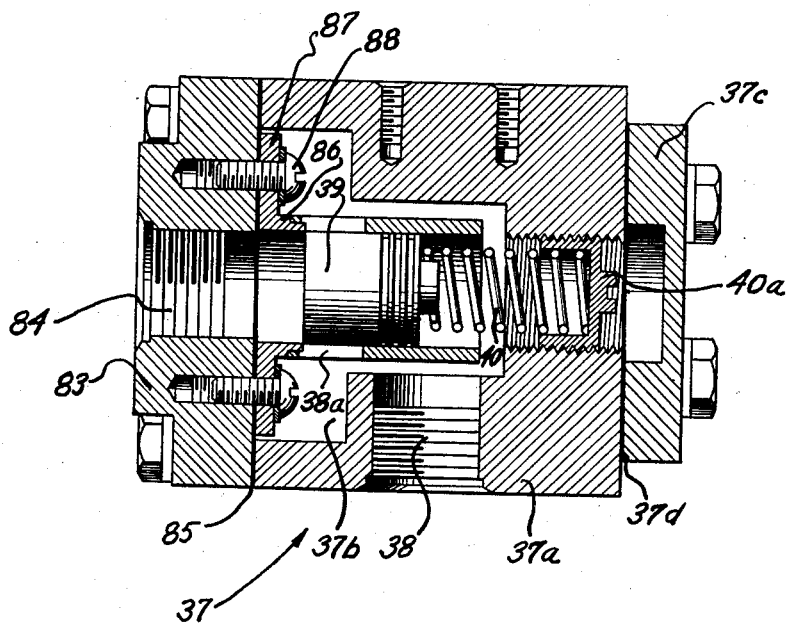
Figure 3 is a cross-sectional view of a self-referencing speed sensing valve embodying the principles of the present invention.

Details of two of the control elements are illustrated in Figures 2 and 3 showing the compensated relief valve 66 and the speed sensing valve 37 respectively. Other of the control elements are constructed as described in the above identified co-pending applications relating to the flow distributor and pilot valve and to the throttle valve respectively.

The compensated relief valve, preferably constructed as shown in Figure 2, and identified generally by the numeral 66, has a cylinder body 68a having a cylinder wall insert 68b therein bored as a cylinder as indicated at 68. The insert or sleeve axially and slidably carries a piston 67 for reciprocation in the cylinder 68. A cover member 69a is secured to the body 68a preferably with a sealing gasket 69b therebetween. The cover member 69a has an axial threaded bore 69 therein providing a fluid inlet to the relief valve structure.

A fluid outlet 70, of threaded bore character, extends radially through the side of the housing 68a and communicates with apertures 70a through the side walls of the insert sleeve 68b thereby communicating the outlet 70 with the interior of the cylinder 68. The cylinder 67 has a length sufficient to close the inlet 69 from the outlet 70 and has a stop shoulder 67a at the end thereof opposite to the inlet 69. The stop shoulder butts against an end of the insert sleeve 68b when the valve is in closed position. The corresponding end of the housing 68a is internally threaded to carry a biasing spring retaining annulus 71a for controllably and variably biasing a substantially constant force biasing spring 71 between the annulus cap 71a and the stop shoulder 67a of the piston 67.

A reference inlet cap or cover 72a is secured to the housing 68a by any convenient means such as machine screws 72b or the like and is provided with a threaded bore 72 thereby providing a reference inlet to the piston 67 at the end thereof opposite to the end mating with the inlet and outlet 69 and 70 respectively opening and closing the valve. A sealing gasket or the like 72c seals the reference cover 72a against the housing 68a preventing reference fluid leakage.

Although a preferred utilization of this compensated relief valve is as described hereinabove with reference to Figure 1 it will be readily understood that this compensated relief valve is a valve of general utility having a controllable inlet-outlet area and a supplementary inlet for referencing the biasing of the piston 67 thereby assisting in controlling the valve area.

Similarly, in Figure 3 there is illustrated a preferred structure of a self-compensated valve of general utility having a preferred utilization as a speed sensing valve as described hereinabove in conjunction with Figure 1. Here, the valve 37 has a housing 37a having a threaded outlet bore 38 therein preferably extending radially outward therefrom, and a stepped axial passage 37b therethrough. Preferably, the radial outlet 38 communicates with an intermediate diameter portion of the stepped passage 37b, and the smaller diameter section of the stepped passage 37b is threaded for variable reception of a biasing spring retainer cap 40a for controlling the biasing force of biasing spring 40 urging the same against a valve piston 39. A cap 37c, recessed for the spring bias cap 40a is secured to the rear end of the housing 37a and is provided with a sealing gasket 37d between the abutting faces of the cover 37c and the housing 37a.

At the opposite end of the housing 37a, the end thereof having the largest portion of the stepped passage 37b, an inlet cover 83 is secured thereto. The front cover 83 is provided with an axial threaded inlet bore or the like 84 and on its rear face carries a sealing gasket or the like 85 preventing leakage from between the front cover 83 and the housing 37a. Also secured to the rear face of the front cover 83 is a shouldered cylinder member 86 having a flange portion 87 secured to the rear face of the front cover by any convenient means such as machine screws or the like 88.

The cylinder member 86 has an axial passage therethrough for slidably carrying the piston 39 therein for opening and closing the valve. The outside diameter of the valve cylinder 86 is preferably of lesser dimension than the intermediate diameter of the axial passage 37b thereby providing fluid passage thereabout, to the outlet 38, and to the rear face or spring engaging face of the piston 39. The cylinder 86 also has a plurality of radial apertures 38a which are outlet apertures from the cylinder for the fluid to be controllably conducted therethrough.

Thus it will be seen that the speed sensing valve structure of Figure 3 is readily adapted to be opened and closed by appropriate axial displacement of the piston 39, and that the piston 39 is axially displaceable as a linear function of the fluid pressure applied thereagainst with self-referencing of the outlet pressure against the rear face of the piston 39 added to the biasing forces of the spring 40 against the rear face of the piston. The self-referencing passage is provided by the passage between the outer circumferential face of the cylinder 86 and the circumferential face of the intermediate section of the stepped axial bore 37b in the housing 37a. Upon closing of the valve 37 the piston 39 is prevented from escaping through the inlet port 84 by a construction which provides a shoulder at the junction of the inlet port and the inner periphery of the cylinder 86. Since the inlet port 84 is preferably of slightly less diameter than the inner periphery of the cylinder 86, the piston 39 will abut against the shoulder at this junction and will be prevented from escaping through the inlet port 84.

From the foregoing it will be readily observed that numerous modifications and variations may be made without departing from the spirit and scope of the novel concepts and principles of the present invention. I, therefore, intend to cover all such modifications and variations as fall within the true spirit and scope of my invention.

I claim as my invention:

1. A fuel flow and control system to control fuel flow for a gas turbine or the like and operative irrespective of undesirable contaminants in the fuel, comprising a fuel system including, in series, a fuel pump, a fuel pressure regulator valve, flow distributor valves, and a plurality of parallel fuel nozzle valves receiving fuel from said distributor valves, a control medium system isolated from the fuel system to prevent intermixing of fluids and including, in series, a control medium positive fixed displacement pump, a speed sensing valve maintaining a pressure drop thereacross linearly related to output of said pump, a throttle valve, a pilot valve, a fuel nozzle simulating member, a relief valve connected across said throttle valve and across said speed sensing valve and said pump and controlled by the pressure across the throttle valve to permit a by-pass of control medium across the control medium pump to maintain substantially constant control medium pressure drop across said throttle valve, means responsive to the pressure drop across the speed sensing valve and operably connected to said throttle valve to regulate control medium flow therethrough in accordance with speed of operation of said gas turbine or the like, further means coupled to said throttle valve to regulate control medium flow therethrough in accordance with variable control oil pressure from regulator means, a relief valve connected across said fuel pump, said fuel pressure regulator valve connected to be responsive to pressures in the fuel and control medium system to maintain substantially equal input pressures to said pilot valve and said flow distributor valves, said pilot valve and said flow distributor valves being mechanically interconnected for joint operation whereby said pilot valve and flow distributor valves open and close jointly, and means sensing control medium pressure between said pilot valve and said nozzle simulating member and comparing the same with fuel pressure just downstream of said distributor valves to operate said fuel nozzle valves in a manner to maintain a fixed ratio between the last two mentioned pressures.

2. A fuel flow and control system to control fuel flow for a gas turbine or the like, comprising, a fuel flow system for a turbine or the like, a control medium flow system flow isolated from said fuel flow system and controlling fuel flow through said fuel flow system, a throttle valve having an inlet and outlet in said control medium flow system, a positive displacement pump in the control medium flow system driven at the speed of the turbine or the like, a speed sensing valve in said control medium flow system downstream of said pump to produce a pressure drop in the control medium system and responsive to the pump output, means responsive to the pressure drop to control the opening of said throttle valve in accordance with the pump output, a relief valve connected to be responsive to the pressure across said throttle valve and connected to by-pass control medium from upstream of said throttle valve to maintain substantially constant pressure drop across said throttle valve, means regulating the pressure in the control medium system downstream of the throttle valve as a function of the flow downstream of the throttle valve, and valve means in said fuel system regulating fuel flow responsive to said pressure downstream of said throttle valve.

3. A fuel flow and control system of the character defined in claim 2, in which the speed sensing valve includes a piston axially displaceable as a function of fluid pressure applied thereagainst.

4. A fuel flow and control system of the character defined in claim 2, in which the speed sensing valve is connected at its inlet end to the positive displacement pump and at its outlet end to the throttle valve.

5. A fuel flow and control system of the character defined in claim 2, in which the relief valve is connected to the speed sensing valve outlet, and also to the positive displacement pump inlet to maintain the pressure drop across the throttle valve substantially constant.

6. A fuel flow and control system to control fuel flow for a gas turbine or the like, comprising: a fuel flow system and a control medium system isolated therefrom and regulating fuel flow therethrough; said control medium system including a throttle valve, a positive displacement pump driven at the speed of the turbine, a speed sensing valve downstream of the pump to produce a pressure drop in the control medium system, means responsive to the pressure drop to control opening of the throttle valve in accordance with pump output, a relief valve to maintain a constant pressure drop across said throttle valve, and means regulating the pressure in the control system downstream of said throttle valve as a function of flow downstream of said valve; said fuel flow system including valve means regulating fuel flow responsive to said pressure downstream of the throttle valve.

References Cited in the file of this patent

UNITED STATES PATENTS

| | | |
|---|---|---|
| 1,290,513 | Collins et al. | Jan. 7, 1919 |
| 1,879,020 | Balsiger | Sept. 27, 1932 |
| 2,127,172 | Hermitte | Aug. 16, 1938 |
| 2,438,998 | Halford | Apr. 6, 1948 |
| 2,520,967 | Schmitt | Sept. 5, 1950 |
| 2,545,698 | Holley et al. | Mar. 20, 1951 |
| 2,601,849 | Lee | July 1, 1952 |
| 2,605,709 | Jubb | Aug. 5, 1952 |
| 2,606,066 | Thompson | Aug. 5, 1952 |
| 2,642,719 | Walker | June 23, 1953 |
| 2,651,261 | Davies | Sept. 8, 1953 |
| 2,661,796 | Davies et al. | Dec. 8, 1953 |
| 2,668,585 | Oestrich | Feb. 9, 1954 |
| 2,669,094 | Lee | Feb. 16, 1954 |
| 2,670,599 | Davies et al. | Mar. 2, 1954 |
| 2,674,847 | Davies et al. | Apr. 13, 1954 |
| 2,692,132 | Murry et al. | Oct. 19, 1954 |
| 2,706,520 | Chandler | Apr. 19, 1955 |
| 2,762,426 | Wood et al. | Sept. 11, 1956 |
| 2,774,414 | Machlanski | Dec. 18, 1956 |